Dec. 21, 1954   R. W. FALCONER   2,697,387
APPARATUS FOR WINDING TUBES
Filed April 27, 1951   4 Sheets-Sheet 1
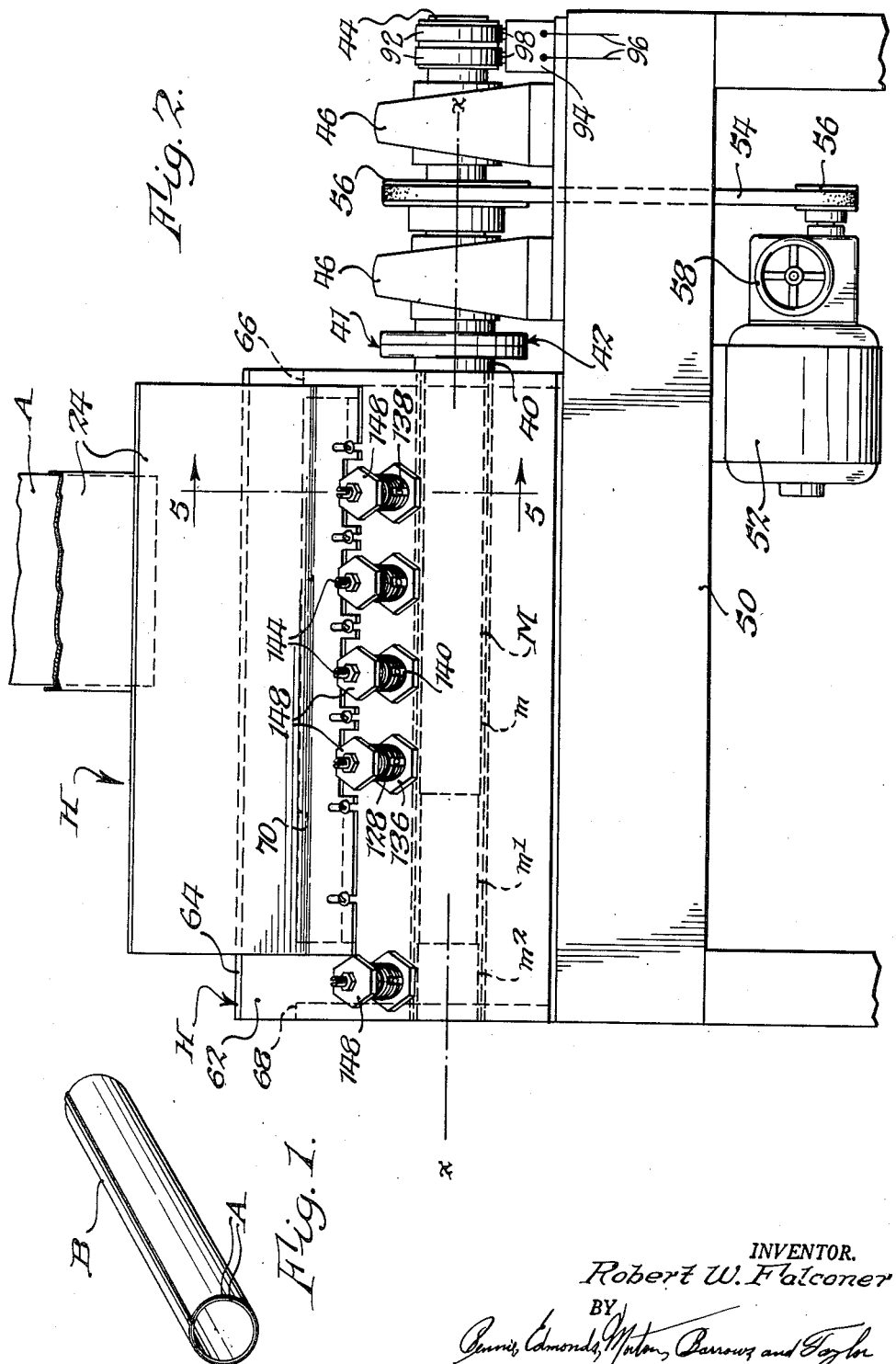
INVENTOR.
Robert W. Falconer
BY
Pennie, Edmonds, Morton, Barrows and Taylor
Attorneys

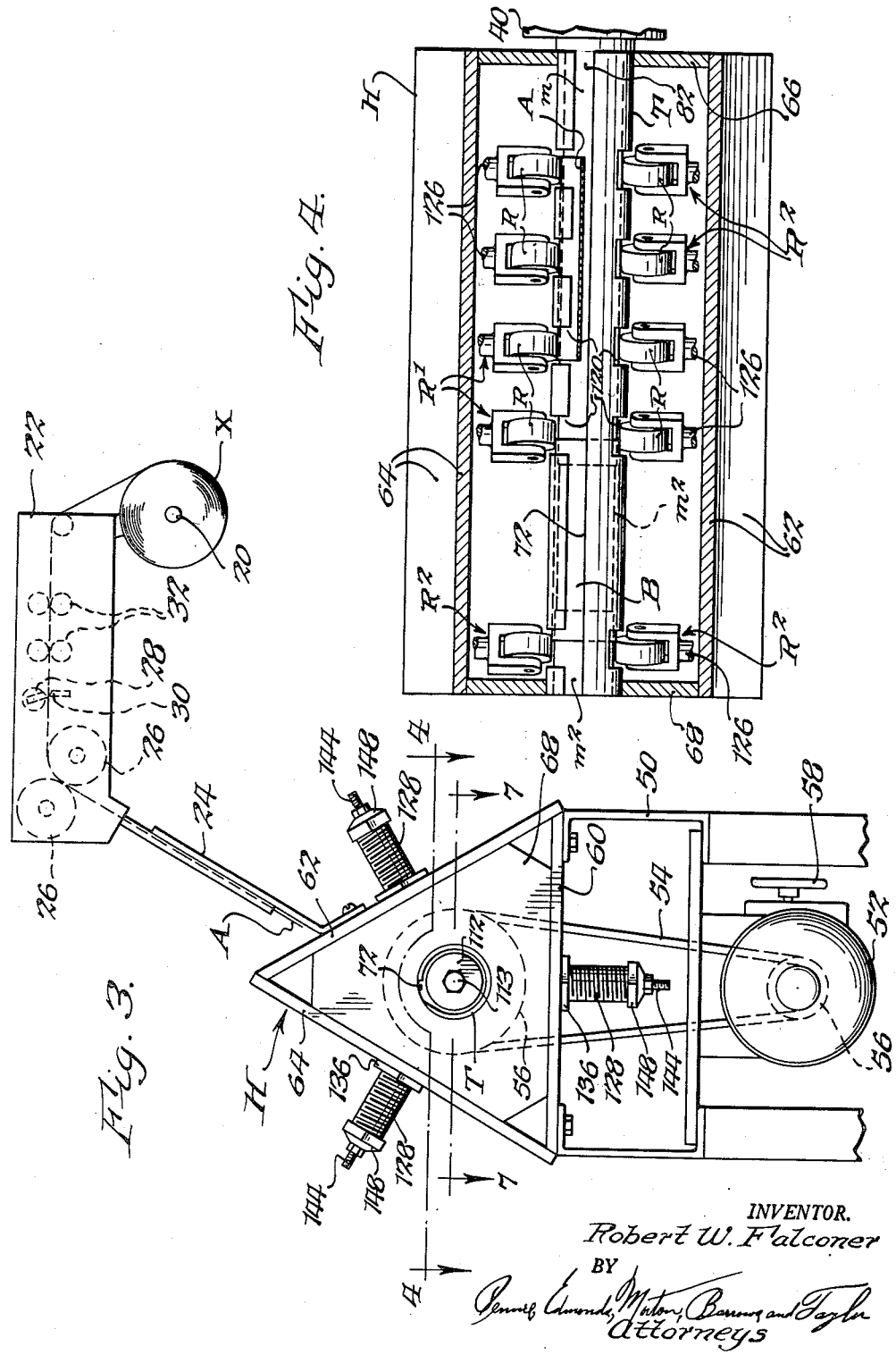

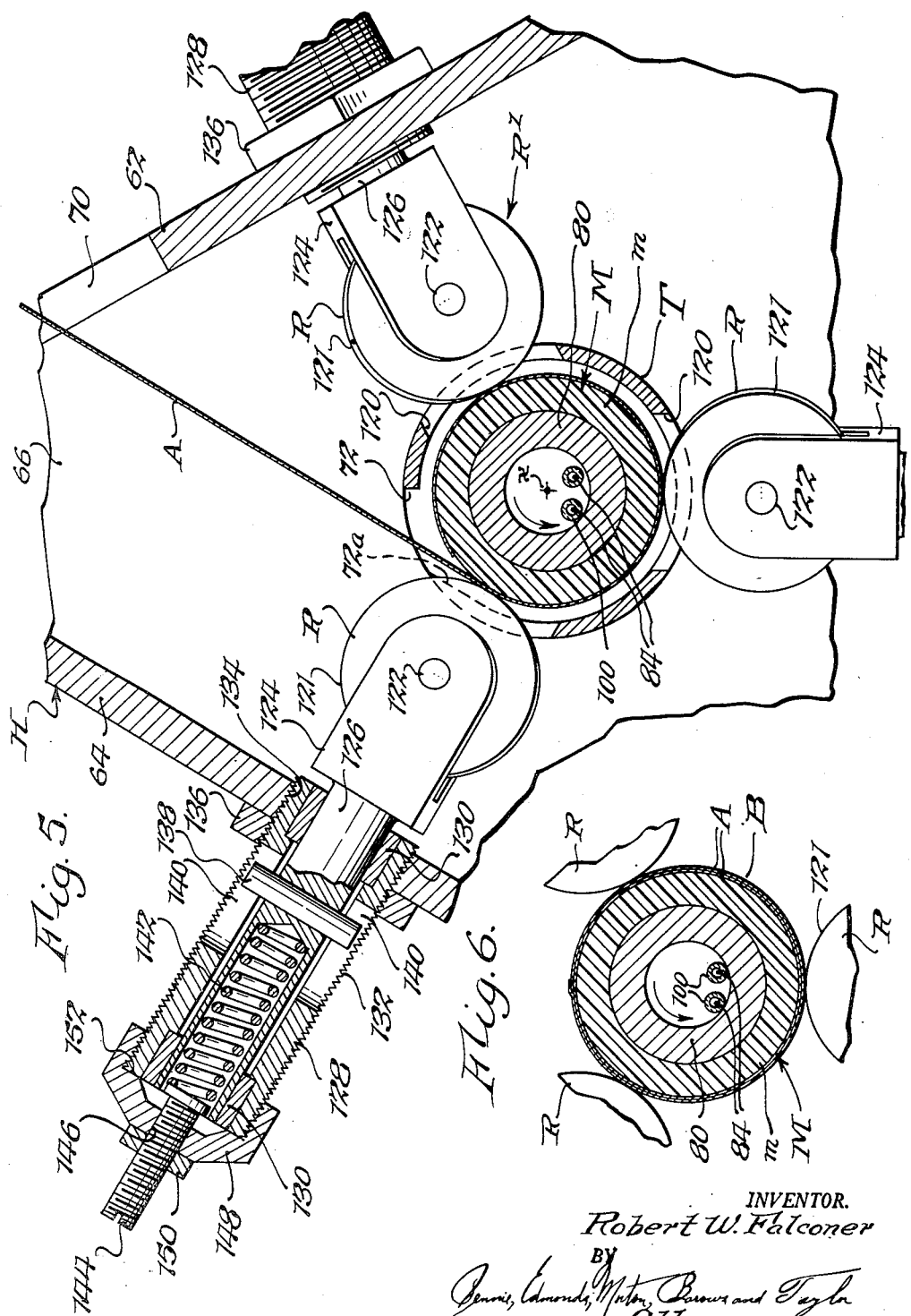

Dec. 21, 1954        R. W. FALCONER        2,697,387
APPARATUS FOR WINDING TUBES
Filed April 27, 1951        4 Sheets-Sheet 4
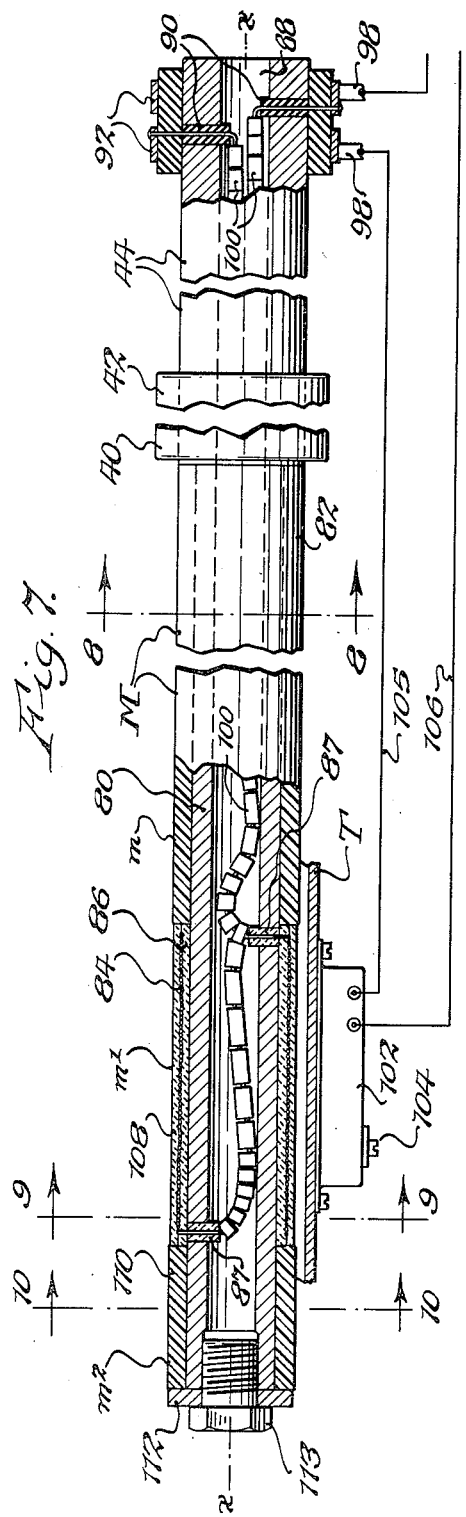
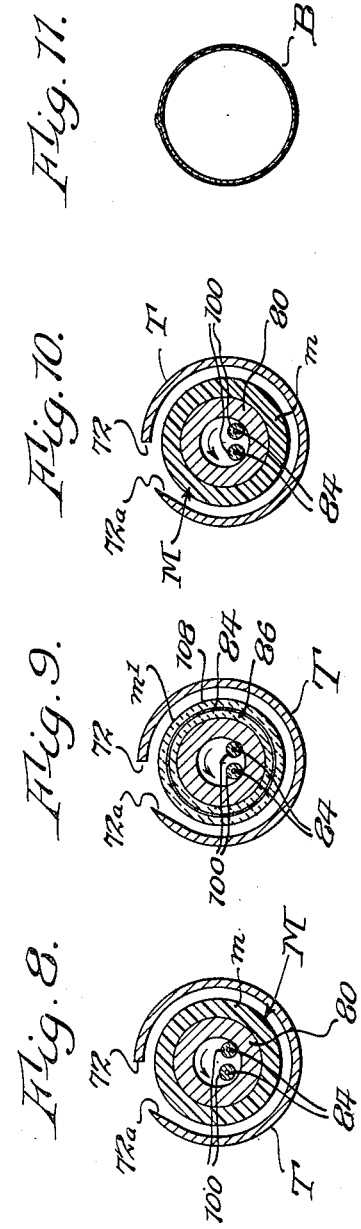
INVENTOR.
Robert W. Falconer
BY
Dennis, Edmonds, Morton, Burrows and Taylor
Attorneys United States Patent Office 2,697,387
Patented Dec. 21, 1954

2,697,387

APPARATUS FOR WINDING TUBES

Robert W. Falconer, Lancaster, N. Y., assignor to Daystrom Incorporated, Elizabeth, N. J., a corporation of New Jersey Application April 27, 1951, Serial No. 223,201

9 Claims. (Cl. 93—81)

This invention relates to a novel machine for convolutely winding cylindrical tubing or tube bodies from flexible metallic foils or sheets or from other flexible sheets.

More particularly the invention has to do with making such tubes or tube bodies by convolutely winding such items from sheets of non-thermoplastic materials.

Thin, flexible sheet aluminum or the like foil, coated or laminated with thermoplastic heat-sealable materials is an example of the type of material from which such convolutely wound tube bodies may be made.

The tubes or bodies may also be formed from sheets of thermoplastic or heat sealable materials.

Machines have been proposed for making tube bodies in which heat and pressure may be provided for heat-sealing the thermoplastic materials or for sealing the coatings or laminations of such sheets when tubes are made with non-thermoplastic metals or other materials.

In machines for this purpose of which I am aware, the sheets or elements of which the tubes or tube bodies are made are first convolutely wound upon a mandrel at a selected station, without any endwise movement on the mandrel and are then advanced along the mandrel to another station where heat or both heat and pressure is applied to heat seal and bond the tube bodies.

Other stations may be used to effect further operations, but the tube bodies remain stationary at the various stations and intermittently operable means of some sort must be provided to shift the work pieces along the mandrel step by step from one operation to the next.

The need for using such intermittent mechanisms complicates the machine and greatly adds to its cost.

In addition valuable time is occupied in the operation of such devices which, if available for other use would greatly increase the total number of tubes or bodies which could be made in a given time.

It is an object of the present invention to provide a machine for making convolutely wound tube bodies from materials of the kind stated which is of inexpensive and simple construction and upon which the operations for making tube bodies proceed continuously without intermittent operation.

A related object is to provide such a machine upon which tube bodies are made quickly at low cost by simple operations to the end that large numbers of the tubes per hour may be made.

A further object is to provide a machine for this purpose in which a tube body may have selected operations performed thereon simultaneously with the performance of the same or other operations on other tube bodies.

Another object contemplates a machine in which the convolute winding of a sheet of material into a tube body may occur simultaneously with heating and/or sealing operations on other tube bodies; also to provide for the simultaneous endwise movement of the sheet from which one tube is being wound while endwise movement of one or more other tubes is taking place.

Still another object of the invention is to provide a machine for the purpose stated having a rotating mandrel on which a sheet may be convolutely wound at the same time that the sheet is receiving endwise movement along and relative to the mandrel; also to provide, in such a machine, means whereby the foregoing operations may occur concomitantly with the endwise advance movement of other, already wound tube bodies along the mandrel.

Another object of the invention is to provide a machine for the purpose stated in which the thermoplastic bonding agent used for sealing the overlapping layers of sheet material is heated by simple means under adequate control as to temperature to the end that uniform results are had in making the tube bodies.

A related object is to provide a simple construction for supplying a source of electrical power to said heating means operable by the machine driving means.

A further object is to provide means operable sequentially after the heating operation on the tube bodies to effect a smoothing out and pressure ironing of the bodies to thoroughly bond the thermoplastic material to the laminated sheets while in a still warm or plasticized condition.

Another object of the invention is to construct the machine so that one mandrel upon which tube bodies are formed can be easily and quickly removed and replaced by another of the same or of a different size.

An important object is to provide a tube body making machine of the kind above set forth having a rotating mandrel upon which the tube bodies are formed and in which rotatable elements associated with the mandrel and automatically operated thereby co-operate therewith in winding the sheets one after another on the mandrel.

A related object is to provide a machine in which the foregoing rotatable elements also act to automatically urge the rolled up tube bodies to travel or move endwise along and relatively to the mandrel through one or several selected zones of operation.

Various other objects and advantages of this invention will be apparent from the disclosure and description thereof which follows, and the novel features thereof will be set out in the claims appended.

In the accompanying drawings forming a part of the specification of this invention, an embodiment of a machine for convolutely winding cylindrical tube bodies is illustrated, in which:

Fig. 1 is a perspective view of a tube body which has been formed on the machine.

Fig. 2 is a side elevation of the machine.

Fig. 3 is an end elevation thereof, as seen from the left hand end of Fig. 2.

Fig. 4 is a horizontal section of part of the machine, taken approximately on line 4—4 of Fig. 3.

Fig. 5 is a fragmentary vertical section thereof, on an enlarged scale, on line 5—5 of Fig. 2, illustrating a sheet of foil or material passing into winding relation with the mandrel.

Fig. 6 is a fragmentary similar vertical section illustrating the foil or sheet of Fig. 5 after being completely wound on the same portion of the mandrel.

Fig. 7 is a fragmentary side elevation of the mandrel, viewed partly in longitudinal section on line 7—7 of Fig. 3.

Figs. 8, 9, and 10, are transverse vertical sections of the mandrel and its associated cage taken along the lines 8—8, 9—9, and 10—10 respectively of Fig. 7.

Fig. 11 is a cross section of a completed tube body, after discharge from the machine.

For convolutely winding tubes or tube bodies in accordance with the invention here set forth it may be assumed that these bodies are to be formed from rectangular sheets or pieces of aluminum foil and that the resulting tubes when completed may be made into collapsible containers to contain tooth paste or other materials of that general character.

These sheets may be coated with one or more laminations of a selected thermoplastic or heat-sealing material.

While the supply of such sheets may be previously cut to required size and stacked in a pile, the drawings, see Fig. 3, illustrate a supply of suitable coated foil or sheet material in the form of a continuous roll X rotatably supported on a spindle 20, journalled in bearings on one end of a box 22.

A suitably inclined guide 24 at the other end of box 22 may direct pieces A of the foil or material, of required size to make the desired tubes, into the machine.

The precise mechanism for this purpose forms no part of the invention, and is shown somewhat diagrammatically since it is of well known form and is commercially available.

The material may be drawn from the roll X by a pair of suitably driven rolls 26 and cut to required length, as by an intermittently actuated, rotary cut-off knife or shear 28, timed to sever the foil to proper length by co-operation with a stationary knife or bar 30.

Side edge trimmers 32 may be used, if necessary, where the side edge portions or margins of the foil are required to be trimmed to make all foil sections A of the same width.

The tubes or tube bodies B, Figs. 1 and 11, are fashioned in accordance with the invention, on a continuously rotating cylindrical mandrel M, revolving on a horizontal axis *x*. The right hand end of the mandrel M is fashioned to shoulder against the hub 40 of a coupling flange 41, by which it may be removably fixed, by suitable screws or fastenings to a flange 42 at one end of a hallow driving shaft 44 rotatable on axis *x*.

With this machine foil tubes or bodies B of various different diameters can be made by merely providing a set of mandrels of the required different diameters to fit the internal diameters of the tubes required. To shift from the making of one size tube to that of another, it is only necessary to detach the mandrel in use and replace it with the one desired, by attaching its flange 41 to the flange 42 of the driving shaft 44.

Then by appropriate adjustment of certain devices to be described and the provision of a supply of foil blanks A of proper size, work on the selected size of tubes can proceed.

Shaft 44 may be journalled in bearings 46 at the right hand end of a supporting frame 50, see Fig. 2.

The shaft 44 and mandrel M may run at a speed of, say 500 R. P. M., but such speed may be varied, as desired, to suit the need of the materials used or in accordance with varying diameters of tubes and consequent varying mandrel diameters, by the provision of a variable-speed, gear type motor 52 of known construction, mounted on the frame 50 and connected by a belt 54 and pulleys 56 to the shaft 44. Change of speed may be secured by suitable adjustment of a hand wheel 58 in a well known manner.

The mandrel M, see Figs. 2–4, extends and is enclosed, at the left hand end of shaft 44, within a housing or casing H, which may be of generally triangular shape in transverse section. The housing H shown includes a horizontal plate 60 fastened to the top of frame 50 and opposite angularly disposed front and rear side plates 62 and 64 which project from the side edges of the plate 60. These plates engage at their top edges and at their opposite ends they and plate 60 are secured to triangular end plates or members 66 and 68.

The aforementioned foil or sheet guide 24 may be fixed on and project angularly upwards from the side plate 62, Fig. 3, and may act as a support for the box 22.

As shown in Fig. 5, the side plate 62 is cut away to provide an opening 70 through which pieces of foil, or other sheets A may be delivered one after another from the guide 24 into the housing H to move into operative relation to the rotating mandrel M therewithin to be convolutely wound thereon.

As will be seen in the drawings Figs. 3, 4 and 8–10, there extends lengthwise of and in spaced axial relation to the mandrel M a stationary guide tube or cage-like member T of substantially cylindrical form and the axis of which coincides with the axis *x* of the mandrel. This guide tube or member is slit or cut-away lengthwise at 72. This slit 72 is disposed in a direction to tangentially face the discharge end of the guide or chute 24. Tube or cage T may be conveniently fixed by securing its opposite ends in holes in the opposite end plates 66 and 68 of the housing H, as seen in Fig. 4.

In Fig. 7, the mandrel M is seen to comprise a relatively long right hand section *m*, an intermediate section *m*1, and a short left hand rear or terminal section *m*2. These parts constitute respectively the tube winding section, the tube heating and sealing section and the pressure receiving or rolling section of the mandrel M.

It will be seen upon reference to Figs. 2 and 3 that the sheet foil or delivery means, including box 22 and the guide 24 are disposed generally opposite the mandrel winding section *m*, so that as pieces of material A are successively cut off the supply roll X and drop down through guide 24 the forward edge of each piece will drop through the slit 72 into cage T and into engagement with the adjacent winding section *m* of mandrel M.

The mandrel M is cylindrical as stated, and as shown in Figs. 4 and 7 is of substantially the same diameter throughout its operating length.

The mandrel includes an inner element for supporting the winding section *m*, the heating and sealing section *m*1 and the rolling or tube pressing section *m*2. Such element, in the construction illustrated, comprises a pipe or hollow metal member 80 which projects from the mandrel supporting hub 40 and flange 41.

The foil or sheet winding section *m* is formed by a sleeve or tube 82 the length of which may be varied but is preferably such that it has a capacity to receive for winding the widest sheets or foil pieces A from which the longest tubes intended to be provided on the machine can be made, as delivered from a supply roll X or from stacks already cut.

The element or sleeve 82, of an outside diameter conforming to the inner diameter of the tube bodies to be formed, is preferably made of some material exhibiting a low friction factor with respect to the slidability of the foil tubing to be engaged therewith so that free, easy lengthwise movement therealong of rolled up pieces of material A may be effected. Such material may be glass or polished metal, but preferably a commercial compound or plastic material, named "Teflon" is used as it is readily available and possesses the desired characteristics.

In order to provide the necessary supply of heat for heat-fusing the thermoplastic coating or laminations or other binding or sealing agent used to seal or bond the rolled tubes A, the intermediate section *m*1 of the mandrel, which was previously mentioned, also comprises a cylindrical structure surrounding a portion of the mandrel element 80. This structure has therein a suitable electrical resistance wire or coil 84, Figs. 7 and 9. The coil may be wound about a screw thread-like outer surface of a sleeve 86 of "Transite" or the like material pressed on the tube 80, as shown in Fig. 7 so as to be closely wound to extend substantially throughout its length. Multiple winding may be used, if desired.

"Transite" is available in commerce, and its characteristics include its ability to readily transmit heat while at the same time acting as an insulation against the passage of current. It thereby prevents shorting to the tube bodies.

The opposite ends of the wiring 84 may be passed through porcelain or other insulating beads or members 87 seated in the wall of the mandrel tubular element or pipe 80 into the interior bore thereof. The wires 84 may continue thence to the rear end of the mandrel and on through a longitudinal bore 88 in the drive shaft 44.

Here the shaft receives the two ends of the wires and carries them through suitable insulating sleeves 90 to a pair of electrical collector rings 92.

A support 94, Fig. 2, receives a supply of current from conductors 96 and mounts contacts 98 by which the power supply is provided to the rings 92 during rotation of the shaft 44 and mandrel M, in a well known or standard manner.

The wires 84 extending through pipe 80 from the heater section *m*1 to the collector rings may be suitably insulated by porcelain beads or the like 100, as shown.

It is preferable to maintain or control the degree of temperature of the heat passing through the mandrel section *m*1 to the tube bodies to be treated and to be able to vary or adjust this temperature where found desirable.

This is accomplished in the construction herein disclosed by mounting a thermostat 102 on the tube or cage T adjacent the section *m*1 so as to be affected by the transfer of heat therefrom. The thermostat may be adjusted as desired by a screw device 104 and lines 105, 106 respectively extend from the thermostat to the contacts 98 to cut off or control the current to collector rings 92. Thus the current may be intermittently closed and opened by the thermostat to effect a substantially uniform degree of heat for application to the work in hand.

The electric winding 84 may be suitably retained in place on the inner "Transite" member 86 by an outer sleeve 108 of the same or other suitable material. The sleeve 108, after application will conduct the desired amount of heat therethrough to tube bodies A passing thereover for heat fusing the thermoplastic or other material to the metal foil.

In practice it is found desirable to make the outer diameter of the sleeve 108 very slightly less than that of the winding member section 82. This will prevent dragging or binding of the work passing over the section m1, due to heat expansion.

Outwardly beyond the heating section m1, as just described, the mandrel is also preferably supplied with the section m2, while passing over which the fused or heated tube bodies A may receive a rolling and pressing action to firmly bond the heated layers of the work pieces.

This section m2, while of shorter length than the rolling section m, may be otherwise similar, comprising a tubular piece of "Teflon" or the like 110 of desired diameter and bored to firmly fit on the outer end portion of the pipe or element 80.

The inner and outer ends of the sections m, m1 and m2 are cut square so that they may all be firmly held on the mandrel by engagement of a disc or washer 112 forced against the outer end of member 110, as by a bolt 113 screwed into the threaded outer or free end of the pipe 80, see Fig. 7. Pressure thus applied is transmitted through the three sections, thereby firmly pressing the right hand or inner end of member 82 against the shoulder on the hub 40 of flange 41.

The mandrel M is arranged to rotate in the direction of the arrows shown in the drawings.

The elongated slot 72 of cage or tube T has its front or forward edge beveled or tapered, as at 72a to eliminate a shoulder or obstruction in the path of entry of sheets A to the mandrel. Upon passage of the leading edge of a sheet A from the guide 24 down through the slot 72 this edge will impinge more or less against the inner wall of the tube T and be deflected thereby into a curved condition in which it tends to roll on or wrap itself to some extent about the rotating mandrel, which itself encourages the foil to thus wind on the mandrel.

However, this action, by itself, is not sufficient to insure the necessary quick and uniform results required to form the foil sheets or other sheets into tube bodies on the mandrel, in a relatively tight or close wrapping so that the resulting bodies conform to the mandrel diameter.

It is here, therefore, that certain novel features of the present invention come into play for positively effecting close convolute winding contact of the foil or pieces A with and upon the mandrel M. Here also, after positive winding of the foil on the mandrel has been started, the novel features alluded to are also operable to initiate endwise or axial travel of the partly wound up, and fully wound up sheets or tube bodies along the mandrel to thereby pass the wound up items first, over the heating and sealing section m1 and then over the pressing or rolling section m2 followed by discharge of the work off the mandrel.

The novel features referred to above and their operation are well shown in Figs. 2, 4 and 5.

For the specified purpose there are disposed at intervals along the mandrel M radially arranged groups of pressure rollers R yieldingly engageable with the mandrel surface or with foil sheets A extending thereagainst or thereabout as the case may be.

In the disclosed arrangement there are shown four groups R1 of these rollers operating within the range of the winding section m of the mandrel and one (or more) group R2 extending about the mandrel M for operation within the pressure section m2, preferably, though not of necessity, at the beginning of its zone of operation.

While, as shown, each of the groups R1 and R2 includes three of the rollers R, arranged in the order shown, a different number of such rollers could be used if desired.

Since all of the groups of these pressure rollers R are mounted in the same manner and they all serve an identical purpose, only one roller R and its mounting and function will be described in detail, see Fig. 5.

To enable the rollers to operatively engage the mandrel M, the tube or cage T has a plurality of openings 120 cut therethrough into each of which one roller R may project.

The rolls R are preferably made of hard rubber and each has a flat peripheral surface 121 forming an element of a cylinder.

Referring to the roller assembly at the upper left of Fig. 5, roller R has a pivot or journal 122 rotatably mounted in a stirrup or bracket 124. While not shown, a roller bearing is provided between the roller and its stirrup.

Stirrup 124 is fixed to the inner end of a post or support 126 the axis of which passes across the axis of pivot 122 and lies in a plane radial to the axis x of mandrel M.

Post 126 is disposed axially within a supporting and adjusting sleeve 128 and is rotatably mounted in bearings 130, one at each end thereof.

The sleeve 128 is conveniently mounted for axial movement towards and from the mandrel M by having exterior threads 132 engageable in a threaded hole 134 in the adjacent plate 64 (or the plate 60 or 62 as the case may be) of the housing H.

After the sleeve is in desired position it may be secured by a lock nut 136 threaded on the sleeve and forced into clamping engagement with the face of the adjacent plate.

Fixed in and extending crosswise of post 126 is a guide pin 138 the opposite ends of which slidably engage in longitudinal slots 140 in sleeve 128 whereby the post 126 may have limited axial movement in the sleeve 128 without relative rotation therewith.

The outer end of the post 126 is bored axially to receive a compression member such as the coil spring 142. The head of an adjusting screw 144 bears against the outer free end of the spring 142. The screw 144 is threaded into a central threaded hole 146 in a screw cap 148, which, in turn is threaded to engage about the outer threaded end of the sleeve 128. A lock nut 150 may be operated to clamp a shoulder 152 on cap 148 in engagement with the outer end of the sleeve 128.

By the described construction all parts of the roller mounting can be securely held in any desired position as need to retain the roller R mounted yieldingly thereon in any desired position.

It may be assumed, for the purpose of this disclosure, that the same tube or cage T may be used, within limits, for operation with mandrels M of several different diameters.

When a mandrel size is changed, it may be necessary or desirable to change or vary the extent or amount of pressure exerted by the rollers R thereon.

This is readily done by first loosening the lock nuts 150 on screws 144 and then turning those screws in or out to thereby more greatly compress the springs 142 or allow them to expand, as needed. The posts 126 can then shift towards or from the mandrel until the desired action of rollers R is secured. The guide pins 138 will slide along their slots 140 for freedom of movement of the posts 126 during such adjustment, while preventing rotation of the posts 126 in the sleeves with consequent change in relation of the rollers R with respect to the mandrel M.

It will be noted that the roller mounting at the upper left of Fig. 5 is disposed so that the roller R thereof is located about where the free, forward edge of a sheet A enters the cage or sleeve T and comes into engagement with the mandrel M.

The corresponding rollers R of all the other sets R1 are preferably in like locations, while the other two rollers R of each set R1 are spaced therefrom as shown in Figs. 5 and 6.

The mandrel M which constantly rotates acts, by engagement with all rollers R, to rotate these at approximately the same peripheral speed.

The tubes or bodies B shown each consist of two complete turns of the sheet or foil A about the mandrel plus a narrow overlap to form a finishing seam. However, the number of turns may be varied as desired.

It will be clear from the description of the invention thus far, that as the leading edge of a sheet A passes through the slot 72 into the tube or cage T, it will engage in the bight between the first rolls R of each set R1 and the rotating mandrel M. The action of the mandrel, rotating as indicated, effects rotation of the rolls and urges the sheet A to continue in a direction for convolutely winding on the mandrel. This action continues and the other rolls R of each set sequentially co-operate with the mandrel to completely convolutely wind the sheet into its desired number of turns.

Assuming for a moment that the axes of all the rollers R were arranged truly parallel with the axis x of the mandrel M the rollers would lie directly transversely across the mandrel or in a plane at right angles to axis x.

Under such conditions convolute winding of the pieces A would occur but the wound up bodies would receive no endwise movement along or relatively to the mandrel.

Hence, in accordance with the invention, the rollers R are all set at a slight angle crosswise of the mandrel axis $x$, as shown in Figs. 4 and 5. In this way the peripheral surfaces 121 of the rollers as they rotate, act in the manner of screws, the rollers being turned in a direction to employ this novel action to urge the tube bodies to travel from right to left with respect to Figs. 2, 4 and 7.

The angular setting of the rollers R need be only very small, generally not more than 5 or 6 degrees, with a probable maximum of 12 degrees relatively to axis $x$.

The angular adjustment can be readily made by first releasing lock nuts 136 and turning the threaded sleeves 128 to the required extent. This will cause rotation of the roller-carrying posts 126 through the pins 138 in slots 140. When the required angular setting of the rollers has been attained they are securely set in position for operation by tightening up the lock nuts 136.

If now the machine is started, the shaft 44 and the mandrel M are running in the direction shown and the heating coil 84 is operating at the required temperature, the leading edge of a sheet of laminated or other foil A descending the guide chute 24 will engage in the bight between the first rolls R of one or more of the sets R1 and will be thus urged to wind convolutely around the mandrel M as seen in Fig. 5.

At the same time, due to the angular setting of rolls R the sheet, while still being wound convolutely will be urged to travel or move endwise along the mandrel.

At this time that portion of the sheet which is not yet fully wound up will also be moving along the mandrel through slot 72 over the winding section $m$ towards the heating section $m1$.

The winding action, however, is sufficiently rapid that the rolls R and mandrel M will have completely convolutely wound each sheet before the resulting tube body has been forced from the section $m$ to and along or into the heating zone of section $m1$. Due to the screw thread-like action of the angularly disposed rolls they keep the wound up foil turning or rotating with the mandrel while at the same time moving it enwdise therealong.

Thus by the time a wound up sheet A, in the form of a tube B, has passed beyond reach of the last or left hand set of rolls R1, another sheet A will have reached the sets of rolls R1 to follow the same procedure.

The first tube body B just formed as described, having been moved forward will now be moving endwise along and about the heating section $m1$, where the thermoplastic laminations thereof, or other heat sealing medium will be heated and caused to seal the body into permanent form.

The relative length of the section $m1$ is such that just before the tail end of a tube body B leaves the left hand set of rolls R1 of the winding section, the front or forward end of that body B will have passed beyond the left end of heating section $m1$ to the right hand end or area of the rolling section $m2$. In so doing the tube body will move into engagement with the rolls R of the set R2. These rolls therefore take over the tube body and continue its advance along the mandrel without interruption of the continuous travel of the work.

The action of the rolls R of roll set R2 is to advance the tube bodies B so that they eventually drop off the free end of the mandrel.

In this action the flat cylindrical periphery of these rolls, bearing on the just heat-sealed work piece, will also, during the endwise travel thereof, engage the entire outer surface of the body, effecting an ironing action to smooth out and cause close bonding of the plasticized and still soft thermoplastic laminations to form a uniformly sealed and bonded work piece.

From the foregoing description of the invention it will be seen that pieces of film or sheet A may be fed in close succession, or one after another from the supply X or other source into the machine and as soon as a work piece falls into engagement with the rotating mandrel and is contacted by the first of the rolls R of the sets R1, it not only starts to be convolutely wound on the mandrel, but by action of the various rolls in the winding zone also and concomitantly starts its travel lengthwise along the mandrel. This work is rapidly convolutely wound at the section $m$ and thereafter, will continue as a cylinder to travel along the mandrel without intermission until it falls off the far end of the mandrel.

During this continued and unremitting advance it is carried over the heating zone $m1$ where the thermoplastic or other sealing coating is plasticized to seal the overlapping layers of material together.

Finally, by action of the rolls of set R2 this sealing action is enhanced and completed by the ironing or pressing effected by the last named rolls as they simultaneously move the tube body B towards and finally off the end of the mandrel.

Simultaneously with the foregoing sequential operations on a given work piece other work pieces are being given the same sequential treatment.

The speed of advance, which has been adjusted to suit the conditions in hand is such that the forward ends of succeeding tube bodies follow closely behind the previous bodies so that the capacity of the machine is very large.

It will be noted that the construction shown enables the mandrel to be attached only at one end, and that it nevertheless is held steady and undesirable vibration or chattering reduced to a minimum by the support thereof, at spaced intervals throughout its length by the sturdily mounted rolls R which engage it or the work thereon during operation.

I claim:

1. A machine for forming tube bodies from sheets of material of the character described by convolutely winding a sheet substantially equal in width to the length of a tube to be formed therefrom into laminated layers, said machine including a rotatable mandrel having a sheet winding zone followed by a heating zone, means for heating the latter, rollers spaced about and peripherally engaging said mandrel in said winding zone and rotatable by said mandrel and, in co-operation therewith convolutely winding a sheet thereabout into a tubular body, and said rollers being disposed crosswise of and in angular relation to the axis of said mandrel whereby said rollers are operable, simultaneously with their convolute winding operation, to also urge a sheet being thus wound lengthwise along said mandrel towards said heating zone.

2. A machine for forming tube bodies from sheets of material of the character described by convolutely winding a sheet into overlapping layers, said machine including a rotatable mandrel having a sheet winding zone followed by a heating zone, means for heating the latter, rollers spaced about and peripherally engaging said mandrel in said winding zone and rotatable by said mandrel and, in co-operation therewith convolutely winding a sheet thereabout into a tubular body, and said rollers being disposed crosswise of and in angular relation to the axis of said mandrel whereby said rollers are operable, simultaneously with their convolute winding operation, to also urge a sheet being thus wound lengthwise along said mandrel towards said heating zone, the angular relation of said mandrel and said rollers rotated thereby being such as to completely wind a sheet into a tube body before the latter passes out of said winding zone.

3. A machine for forming tube bodies from sheets of material of the character described by convolutely winding a sheet into overlapping layers, said machine including a rotatable mandrel having a sheet winding zone followed by a heating zone, means for heating the latter, rollers spaced about and peripherally engaging said mandrel in said winding zone and rotatable by said mandrel and, in co-operation therewith convolutely winding a sheet thereabout into a tubular body, and said rollers being disposed crosswise of and in angular relation to the axis of said mandrel whereby said rollers are operable, simultaneously with their convolute winding operation, to also urge a sheet being thus wound lengthwise along said mandrel into and along said heating zone, the angular relation of said mandrel and said rollers rotated thereby being such as to completely wind a sheet into a tube body by the time heat from said heating zone can act upon the body to heat seal the same.

4. A machine for forming tube bodies from sheets of material of the character described by convolutely winding a sheet into overlapping layers, said machine including a cylindrical, continuously rotating mandrel formed of a metallic tube surrounded by an annular layer of a material having a low friction factor upon which tube bodies may easily move along said mandrel, said mandrel having a tube body winding zone followed by a heating zone, an electric heating element embedded in said annular layer of material at said heating zone, electrical conductors leading from said heating element through said metallic mandrel tube to a source of current at an end of said mandrel, means for winding sheets convolutely at said winding zone into tubular bodies and for rotating said wound sheets with said mandrel and simultaneously moving them lengthwise along said mandrel through said heating zone to heat seal said tubular bodies.

5. A machine for forming tube bodies from sheets of material of the character described by convolutely winding a sheet substantially equal in width to the length of a tube to be formed therefrom into laminated layers, said machine including a continuously rotatable cylindrical mandrel, means for driving the same, a stationary tubular cage concentrically disposed about and in spaced relation to said mandrel, said cage being formed with a narrow lengthwise slot extending for at least part of the length of said mandrel for entry therethrough of an edge of a sheet of said material for engagement with said mandrel, and a plurality of rollers each having a flat faced cylindrical periphery projecting through openings in said cage for engagement with and rotation by said rotating mandrel to receive and convolutely wind said sheet thereabout, and said rollers extending angularly crosswise of the axis of said mandrel to thereby effect endwise movement of said sheet along said mandrel simultaneously with the convolute winding thereof.

6. A machine for the purpose described including a housing, a cylindrical mandrel therein, means for effecting continuous rotation thereof, means for delivering sheets to be convolutely wound edgewise through an opening in said housing into engagement with said mandrel, a plurality of rollers, a support mounting each roller on said housing for peripherally engaging said mandrel for co-operation therewith in convolutely winding said sheets about said mandrel into tube bodies and for co-operation therewith in performing other operations on said tube bodies, each of said rollers being rotatably mounted on a post, a threaded sleeve adjustably fixed on said housing for rotation relative thereto to turn said post and thereby set said rollers into different angular relations crosswise of said mandrel, a coil spring between said post and said sleeve to effect yielding engagement of said roller with said mandrel, and means for varying the pressure of said spring on said post.

7. A machine for the purpose described including a housing, a cylindrical mandrel therein, means for effecting continuous rotation thereof, a tubular cage fixed in said housing and extending concentrically about and in spaced relation to said mandrel, said cage being formed with a narrow slot extending lengthwise of said mandrel and being in length substantially equal to the length of a tube to be formed on the mandrel, said housing having an opening therein through which sheets of a width substantially equal to the length of a tube to be formed therefrom may pass edgewise through said slot in said cage into engagement with said mandrel, and said housing having means mounted thereon for yieldably supporting a plurality of rollers passing through openings in said cage into contact with said mandrel for co-operation therewith in convolutely winding said sheets about said mandrel into tube bodies, said rollers being arranged in groups lengthwise of said mandrel to extend angularly across the same whereby, while a sheet is being convolutely wound certain of said rollers will simultaneously move said sheet endwise along said mandrel, and other rollers will be concomitantly moving other, already wound up tube bodies along said mandrel.

8. A machine for forming tube bodies from sheets of material of the character described by convolutely winding a sheet substantially equal in width to the length of a tube to be formed therefrom into laminated layers, said machine including a rotatable mandrel having a sheet-winding zone followed by a heating zone, means for heating the latter, devices spaced about and peripherally engaging said mandrel in said winding zone and rotatable by said mandrel to cooperate therewith in engaging a sheet and convolutely winding the same on said mandrel into a tubular body, said devices being disposed crosswise of and in angular relation to the axis of said mandrel whereby said devices are operable simultaneously with their convolute winding operation to also urge a sheet being thus wound lengthwise along said mandrel toward said heating zone for heat sealing said tube bodies.

9. A machine for forming tube bodies from sheets of material of the character described by convolutely winding a sheet substantially equal in width to the length of a tube to be formed therefrom into laminated layers, said machine including a rotatable mandrel having a sheet winding zone followed by a heating zone, means for heating the latter, a plurality of groups of rotary devices spaced about and peripherally engaging said mandrel in said winding zone and rotatable by said mandrel to co-operate therewith in engaging a sheet and convolutely winding the same on said mandrel into a tube body, at least one of said groups of rotary devices being disposed crosswise of and in angular relation to the axis of said mandrel whereby said rotary devices of said one of said groups are operable simultaneously with their convolute winding operation to also urge a sheet being thus wound lengthwise along said mandrel toward said heating zone and heat sealing said tube bodies.

References Cited in the file of this patent

UNITED STATES PATENTS

| Number | Name | Date |
|---|---|---|
| 155,703 | Burgess | Oct. 6, 1874 |
| 2,048,360 | Spanel | July 21, 1936 |
| 2,321,738 | Farny | June 15, 1943 |
| 2,440,390 | Bogoslowsky | Apr. 27, 1948 |
| 2,489,503 | Sampson | Nov. 29, 1949 |
| 2,569,856 | Hill | Oct. 2, 1951 |

FOREIGN PATENTS

| Number | Country | Date |
|---|---|---|
| 11,338 | Great Britain | of 1887 |